(12) United States Patent
Knight et al.

(10) Patent No.: US 9,403,433 B1
(45) Date of Patent: Aug. 2, 2016

(54) SHIFTER CABLE ASSEMBLY OF A VEHICLE

(71) Applicant: Nissan North America, Inc., Franklin, TN (US)

(72) Inventors: Patrick Knight, Brighton, MI (US); Christopher Gleason, Brighton, MI (US)

(73) Assignee: NISSAN NORTH AMERICA, INC., Franklin, TN (US)

( * ) Notice: Subject to any disclaimer, the term of this patent is extended or adjusted under 35 U.S.C. 154(b) by 0 days.

(21) Appl. No.: 14/673,289

(22) Filed: Mar. 30, 2015

(51) Int. Cl.
*B60K 20/04* (2006.01)
*F16H 61/36* (2006.01)
*F16C 1/10* (2006.01)

(52) U.S. Cl.
CPC ............... *B60K 20/04* (2013.01); *F16C 1/108* (2013.01); *F16H 61/36* (2013.01); *F16C 2361/65* (2013.01)

(58) Field of Classification Search
CPC ..... B60K 20/04; F16C 1/108; F16C 2361/65; F16H 61/36
See application file for complete search history.

(56) References Cited

U.S. PATENT DOCUMENTS

| | | | | |
|---|---|---|---|---|
| 4,075,904 A | * | 2/1978 | Irwin | F16C 1/262 74/502.4 |
| 4,873,884 A | * | 10/1989 | Yamada | B60K 20/04 403/114 |
| 8,857,289 B2 | * | 10/2014 | Gordy | F16C 1/10 74/502.4 |
| 2003/0051570 A1 | * | 3/2003 | Meyer | F16C 1/105 74/502.6 |
| 2003/0221503 A1 | * | 12/2003 | Mita | F16H 61/36 74/473.15 |
| 2008/0250892 A1 | * | 10/2008 | Gordy | F16C 1/10 74/501.5 R |
| 2011/0056325 A1 | * | 3/2011 | Cho | F16C 1/108 74/502.4 |

FOREIGN PATENT DOCUMENTS

| | | | |
|---|---|---|---|
| JP | 2000085395 A1 | * | 3/2000 |
| JP | 2009068518 A1 | * | 4/2009 |
| WO | WO 2013118774 A1 | * | 8/2013 ............. F16C 1/108 |

* cited by examiner

*Primary Examiner* — Drew Brown
(74) *Attorney, Agent, or Firm* — Global IP Counselors, LLP

(57) ABSTRACT

A shifter cable assembly of a vehicle includes a vehicle panel selected from a floor panel and a dash wall panel. A transmission is disposed on a first side of the vehicle panel. A shift member is disposed on a second side of the vehicle panel opposite the first side. A mounting bracket is rigidly attached to the vehicle panel. A sealing grommet has a sealing portion sandwiched between the mounting bracket and the vehicle panel. A shifter cable is received by a conduit portion of the sealing grommet. A first end of the shifter cable is connected to the transmission, and a second end of the shifter cable is connected to the shift member. A damper member is connected to the mounting bracket. The damper member is configured to reduce application to the mounting bracket of vibration generated by the transmission.

20 Claims, 7 Drawing Sheets

SHIFTER CABLE ASSEMBLY OF A VEHICLE

BACKGROUND

1. Field of the Invention

The present invention generally relates to a shifter cable assembly of a vehicle. More specifically, the present invention relates to a damper member that reduces the application of vibration generated by a transmission assembly of a vehicle to a mounting bracket movably receiving a shifter cable.

2. Background Information

Vehicle transmissions transmit power from a vehicle's engine to the wheels. Some transmissions, such as continuously variable transmissions, include a pair of variable diameter pulleys connected by a chain or belt to automatically select an efficient engine speed for the present driving situation. However, such transmissions can transmit vibration to the vehicle structure, thereby generating an undesirable or distracting noise during operation to a vehicle passenger.

SUMMARY

In view of the state of the known technology, one aspect of the resent invention includes a shifter cable assembly of a vehicle including a vehicle panel selected from a floor panel and a dash wall panel. A transmission is disposed on a first side of the vehicle panel. A shift member is disposed on a second side of the vehicle panel opposite the first side. A mounting bracket is rigidly attached to the vehicle panel. A sealing grommet has a sealing portion sandwiched between the mounting bracket and the vehicle panel. A shifter cable is received by a conduit portion of the sealing grommet. A first end of the shifter cable is connected to the transmission, and a second end of the shifter cable is connected to the shift member. A damper member is connected to the mounting bracket. The damper member is configured to reduce application to the mounting bracket of vibration generated by the transmission.

Another aspect of the present invention includes a shifter cable assembly of a vehicle including a vehicle panel selected from a floor panel and a dash wall panel. A transmission is disposed on a first side of the vehicle panel. A shift member is disposed on a second side of the vehicle panel opposite the first side. A mounting bracket is rigidly attached to the vehicle panel, and defines a first conduit opening. A sealing grommet has a sealing portion sandwiched between the mounting bracket and the vehicle panel, and a conduit portion including a projection extending through the first conduit opening. A shifter cable is received by the conduit portion of the sealing grommet. A first end of the shifter cable is connected to the transmission, and a second end of the shifter cable is connected to the shift member. A damper member is connected to the mounting bracket. The damper member has a U-shape including a first leg, a second leg, and a bridge portion between the first and second legs. The first leg, second leg, and bridge portion define a second conduit opening. A periphery of the second conduit opening is aligned with a periphery of the first conduit opening of the mounting bracket on three sides. The projection of the conduit portion of the sealing grommet extends through the second conduit opening. The damper member is configured to reduce application to the mounting bracket of vibration generated by the transmission.

BRIEF DESCRIPTION OF THE DRAWINGS

Referring now to the attached drawings which form a part of this original disclosure.

DETAILED DESCRIPTION OF EXEMPLARY EMBODIMENTS

Selected exemplary embodiments will now be explained with reference to the drawings. It will be apparent to those skilled in the art from this disclosure that the following descriptions of the exemplary embodiments are provided for illustration only and not for the purpose of limiting the invention as defined by the appended claims and their equivalents.

Figure 1:
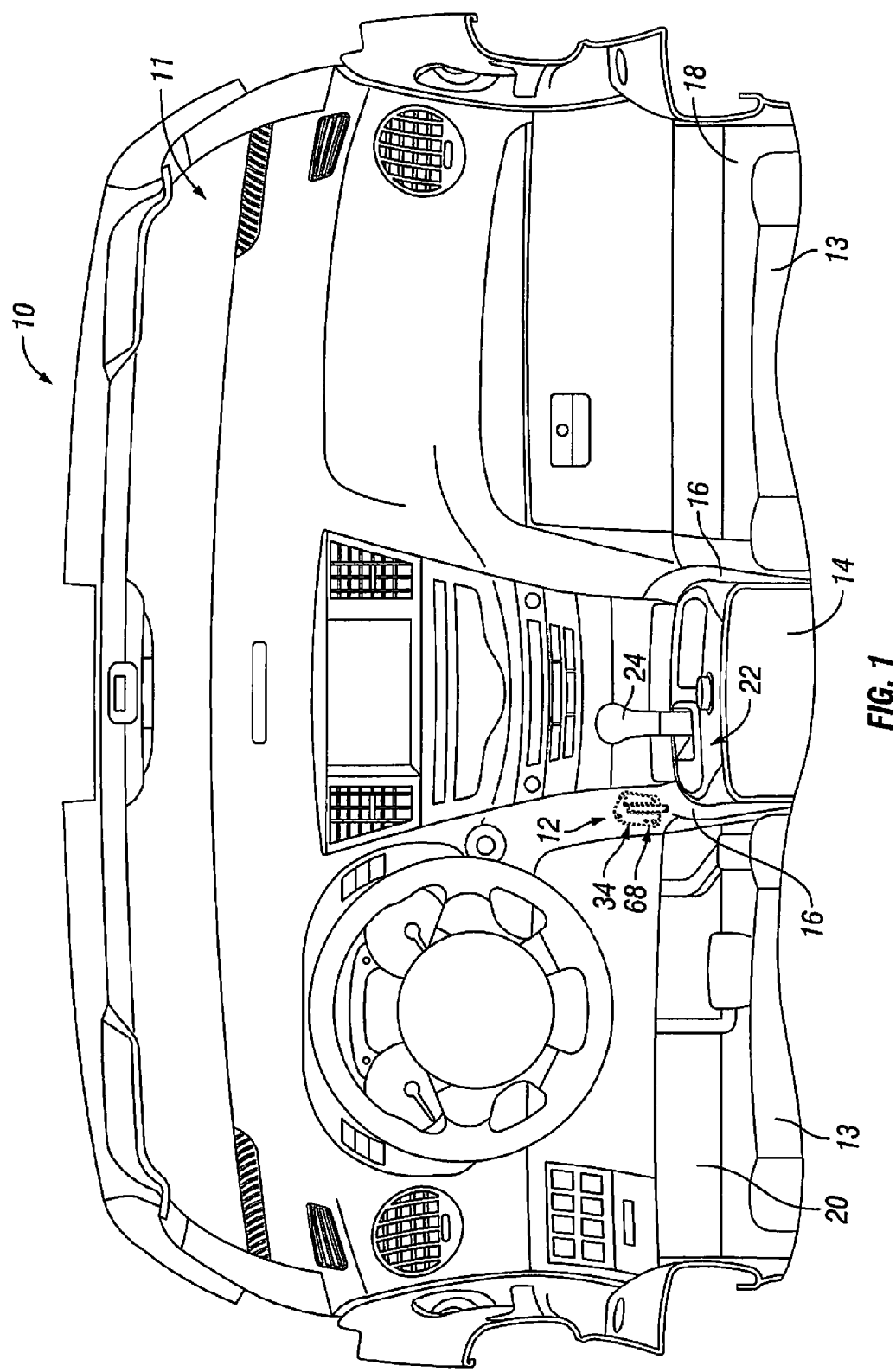
FIG. 1 is a perspective view of a vehicle passenger compartment including a shifter cable assembly in accordance with an exemplary embodiment of the present invention.
Figure 2:
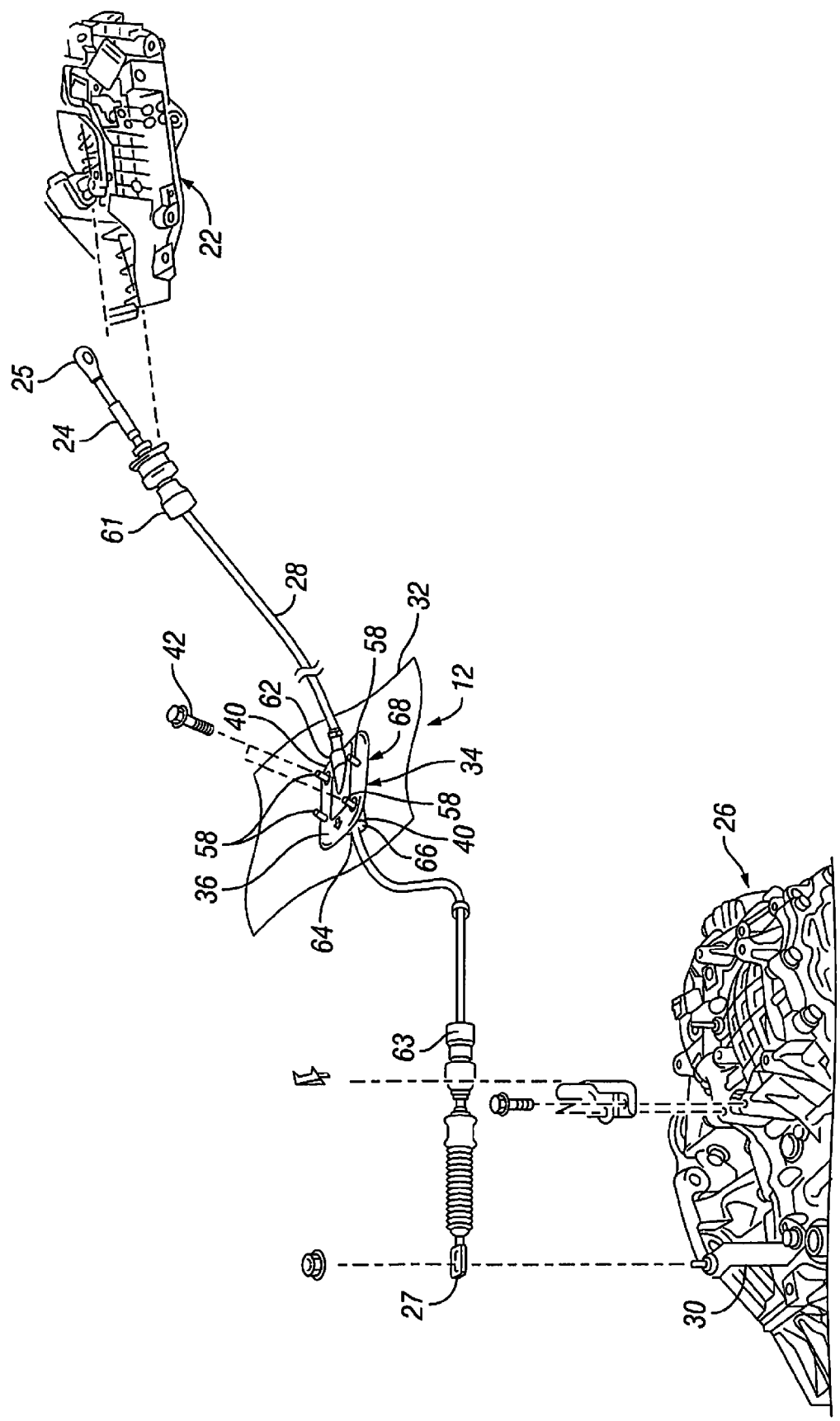
FIG. 2 is a schematic illustration of a shifter cable connected between a transmission assembly and a shift member.

Referring initially to FIGS. 1 and 2, a vehicle 10 including a shifter cable assembly 12 is illustrated in accordance with an exemplary embodiment of the present invention.

The vehicle 10 includes a center console 14 with side trim panels 16. The vehicle 10 further includes a floor panel 18, an upright dash wall panel 20, front seats 13 and the center console 14. The floor 18 and the dash wall 20 at least partially define a passenger compartment 11 of the vehicle 10. The dash wall 18 extends upward from a front edge of the floor 18 and separates an engine compartment (not shown) of the vehicle 10 from the passenger compartment 11. The seats 13 are preferably secured to the floor 18 by fasteners (not shown) within the passenger compartment 11 in a conventional manner. It should be understood from the drawings and the description herein that the vehicle 10 also includes a variety of conventional components that are peripheral to the invention. Therefore, description of these conventional components is omitted for the sake of brevity.

A shift selector assembly 22 is disposed in the center console 14, as shown in FIGS. 1 and 2. A shift member 24 is connected to the shift selector assembly 22 to select a transmission operating mode of a transmission assembly 26 disposed in the engine compartment. The shift member 24 extends out of and above the center console 14 to facilitate operation by a driver of the vehicle 10.

A shifter cable 28 connects the shift member 24 to the transmission assembly 26, as shown in FIG. 2. Movement of the shift member 24 operates a transmission lever 30 of the transmission assembly 26, thereby putting the transmission assembly in the selected drive mode. The transmission assembly 26 can be any suitable transmission, such as a continuously variable transmission (CVT), an automatic transmission or a manual transmission.

The shifter cable 28 passes through a vehicle panel 32 disposed between the shift member 24 and the transmission assembly 26, as shown in FIG. 2. The vehicle panel 32 can be either the floor panel 18 or the dash wall panel 20. The shift member 24 is disposed on an opposite side of the vehicle panel 32 than the transmission assembly 26.

A mounting bracket 34 is rigidly attached to the vehicle panel 32, as shown in FIG. 2. The mounting bracket 34 is shown attached to the dash wall panel 20 in FIG. 1, but can also be rigidly attached to the floor panel 18. As shown in FIGS. 3-6, the mounting bracket 34 has an outer surface 36 facing the passenger compartment 11 and an inner surface 38 facing the vehicle panel 32. A plurality of fastener apertures 40 extend from the outer surface 36 to the inner surface 38 of the mounting bracket 34 to receive fasteners 42 to rigidly attach the mounting bracket 34 to the vehicle panel 32, as shown in FIG. 2. A plurality of projection apertures 44 extend from the outer surface 36 to the inner surface 38 of the mounting bracket 34. A conduit opening 46 extends from the outer surface 36 to the inner surface 38 of the mounting bracket 34.

Figure 3:
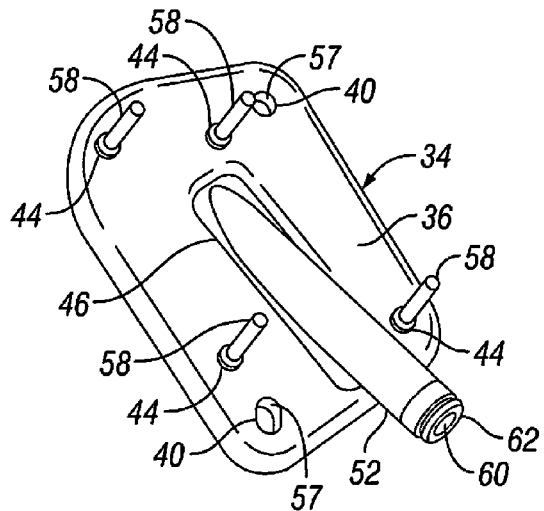
FIG. 3 is a perspective view of the mounting bracket of the shifter cable assembly of FIG. 1.
Figure 4:
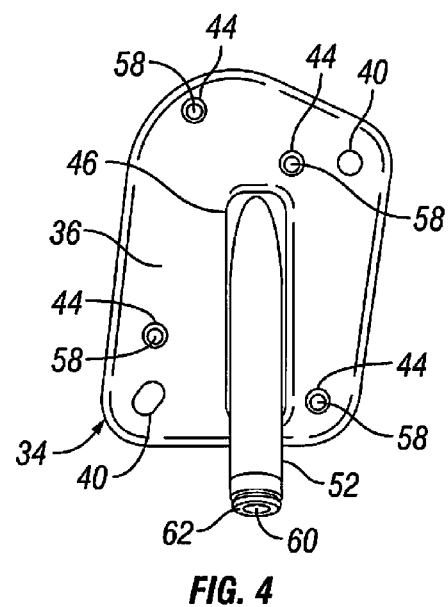
FIG. 4 is a top perspective view of the mounting bracket of FIG. 3.
Figure 5:
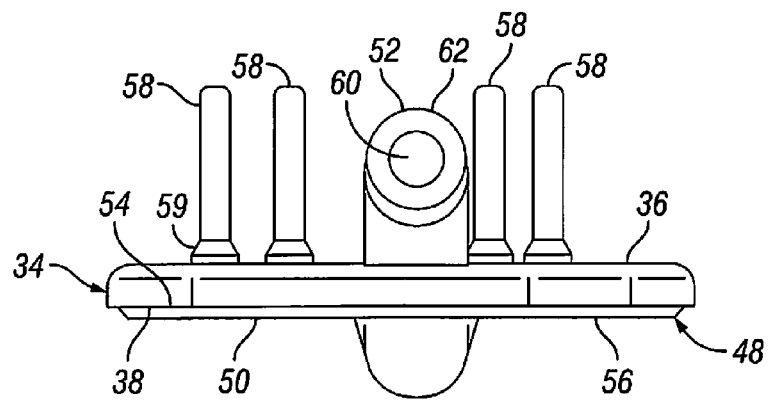
FIG. 5 is a rear perspective view of the mounting bracket of FIG. 3.
Figure 6:
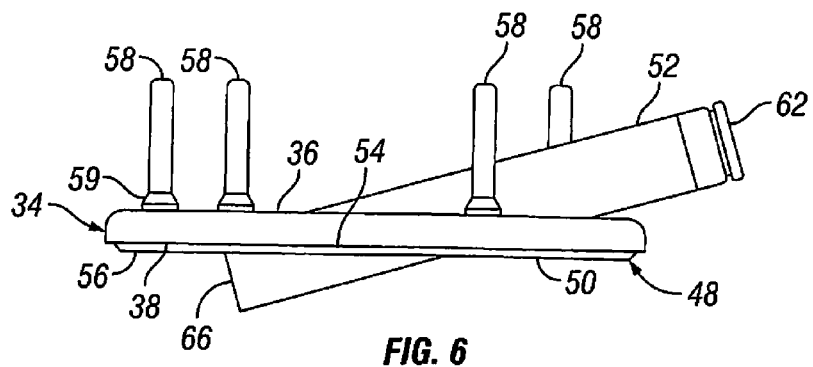
FIG. 6 is a side elevation view of the mounting bracket of FIG. 3.

A sealing grommet 48 includes a sealing portion 50 and a conduit portion 52, as shown in FIGS. 3-6. The sealing portion 50 is disposed between the vehicle panel 32 and the mounting bracket 34. An outer surface 54 of the sealing portion 50 contacts the inner surface 38 of the mounting bracket 34, and an inner surface 56 of the sealing portion 50 contacts the vehicle panel 32 to seal the passenger compartment 11 from the engine compartment when the mounting bracket 34 is installed to the vehicle panel 32. A plurality of fastener apertures 57 extend from the outer surface 54 to the inner surface 56 of the sealing grommet 48, as shown in FIG. 3. A plurality of projections 58 extend outwardly from the outer surface 54 of the sealing portion 50 of the sealing grommet 48. Each projection 58 has a flexible stopper 59 disposed proximate the outer surface 54 of the sealing portion 50. The conduit portion 52 is substantially cylindrical and has an opening 60 at a first end 62 and an opening 64 (FIG. 2) at a second end 66. The conduit portion 52 has a hollow interior, thereby defining a passage extending from the first end opening 60 to the second end opening 64. The sealing portion 50, the conduit portion 52 and the plurality of projections 58 are preferably unitarily formed as a single member. The sealing grommet 48 is made of any suitable sealing material.

Figure 7:
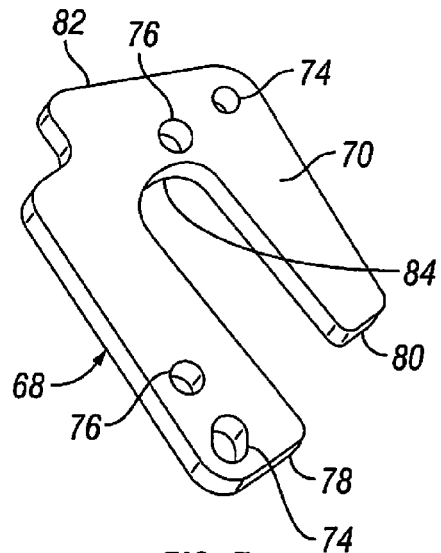
FIG. 7 is a perspective view of the damper member of the shifter cable assembly of FIG. 1.
Figure 8:
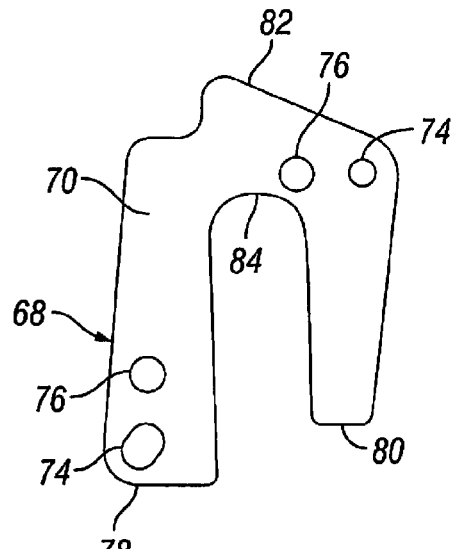
FIG. 8 is a top perspective view of the damper member of FIG. 7.
Figure 9:
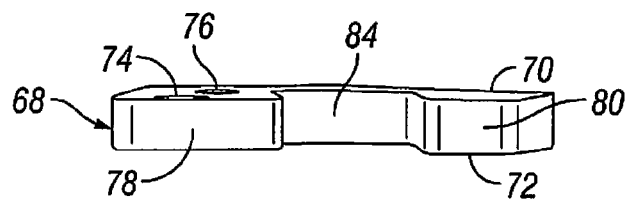
FIG. 9 is a rear perspective view of the damper member of FIG. 7.
Figure 10:
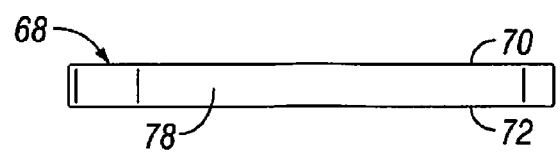
FIG. 10 is a side elevation view of the damper member of FIG. 7.

A damper member 68 has an outer surface 70 and an inner surface 72, as shown in FIGS. 7-10. A plurality of fastener apertures 74 extend from the outer surface 70 to the inner surface 72 of the damper member 68. A plurality of projection apertures 76 extend from the outer surface 70 to the inner surface 72 of the damper member 68. As shown in FIGS. 7 and 8, the damper member 68 is preferably substantially U-shaped, although the damper member can have any suitable shape. A first leg 78 of the damper member 68 is connected to a second leg 80 by a bridge portion 82. The first leg 78, the second leg 80 and the bridge portion 82 define a conduit opening 84 in the damper member 68. The damper member 68 is preferably unitarily formed as a single member and can be made of any suitable material.

An assembled shifter cable assembly 12 is shown FIGS. 11-15. The outer surface 54 of the sealing portion 50 of the sealing grommet 48 is disposed adjacent the inner surface 38 of the mounting bracket 34. The projections 58 of the sealing grommet 48 are received by the mounting bracket projection apertures 44. The projections 58 are pulled through the mounting bracket projection apertures 44 such that the conduit portion 52 is received by the conduit opening 46 in the mounting bracket 34. The flexible stoppers 59 are compressed by the mounting bracket projection apertures 44 as the flexible stoppers 59 pass therethrough. The flexible stoppers 59 expand to their original shape after passing through the mounting bracket projection apertures 44. The flexible stoppers 59 have a diameter that is larger than that of the mounting bracket projection apertures 44 to properly seat the sealing grommet 48 to the mounting bracket 34 and to prevent the projections 58 from passing back through the mounting bracket projection apertures 44 to disengage the sealing grommet 48 from the mounting bracket 34.

Figure 11:
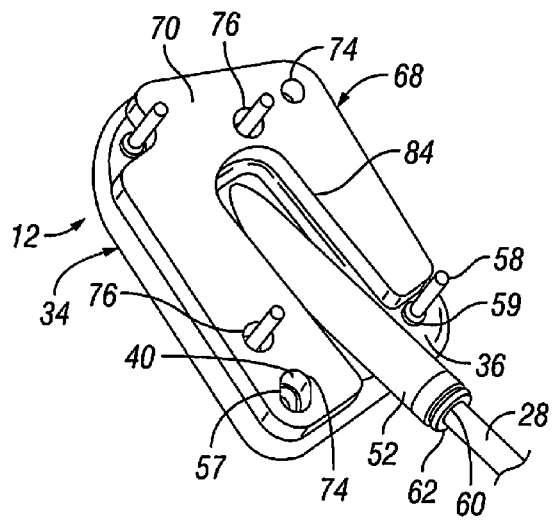
FIG. 11 is a perspective view of the damper member connected to the mounting bracket of the shifter cable assembly.
Figure 12:
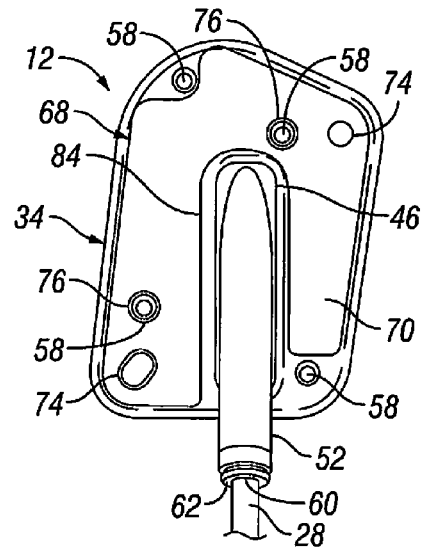
FIG. 12 is a top perspective view of the damper member connected to the mounting bracket of FIG. 11.
Figure 13:
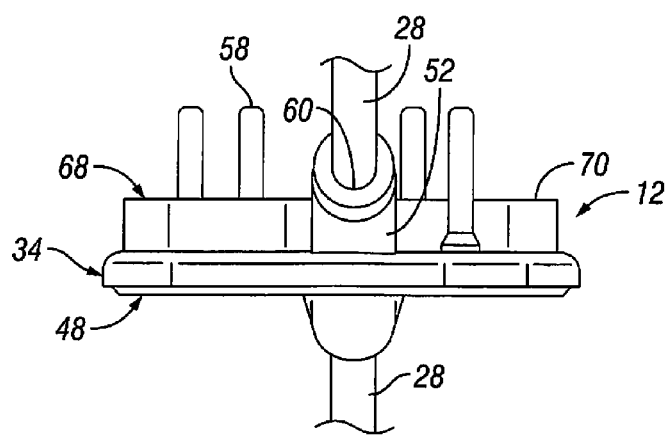
FIG. 13 is a rear perspective view of the damper member connected to the mounting bracket of FIG. 11.
Figure 14:
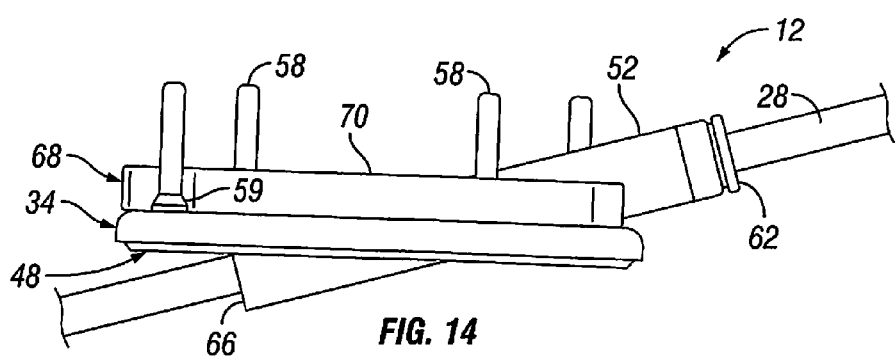
FIG. 14 is a side elevation view of the damper member connected to the mounting bracket of FIG. 11.
Figure 15:
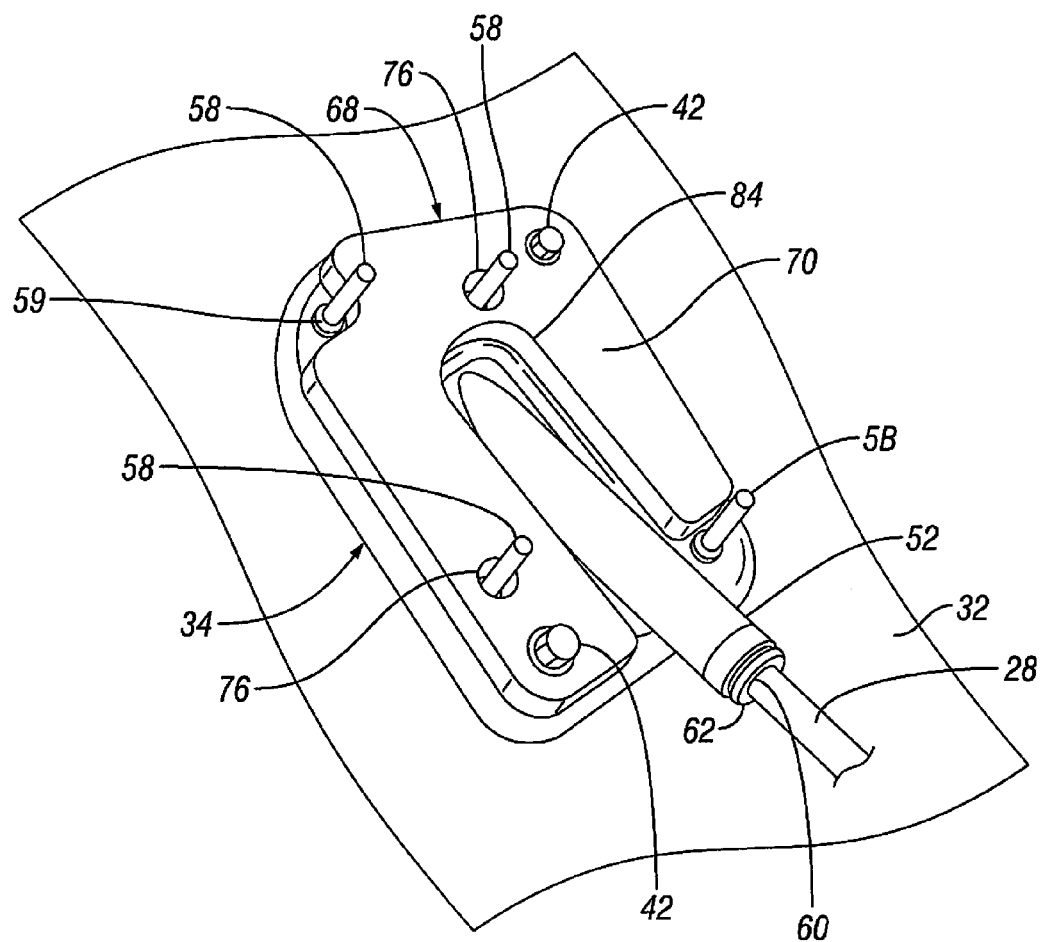
FIG. 15 is a perspective view of the shifter cable assembly mounted to a vehicle panel.

The inner surface 72 of the damper member 68 is disposed adjacent to the outer surface 36 of the mounting bracket 34. The damper member projection apertures 76 receive the sealing grommet projections 58. As shown in FIG. 15, some of the sealing grommet projections 58 can be received by the damper member 68, and some of the sealing grommet projections 58 are not received by the damper member 68. The shape of the damper member 68 substantially corresponds to a shape of the mounting bracket 34, as shown in FIGS. 11-15. A perimeter of the damper member conduit opening 84 is preferably aligned with a perimeter of the mounting bracket conduit opening 46, as shown in FIGS. 11, 12 and 15. The damper member conduit opening 84 receives the conduit portion 52 of the sealing grommet 48. The damper member 68 can be rigidly attached to the mounting bracket 34 in any suitable manner, such as by welding.

The fasteners 42 are inserted through the aligned damper member fastener apertures 74, the mounting bracket fastener apertures 40 and the sealing grommet fastener apertures 57 to rigidly attach the shifter cable assembly 12 to the vehicle panel 32, as shown in FIGS. 1, 2 and 15. Tightening the fasteners 42 sandwiches the sealing grommet 48 between the mounting bracket 34 and the vehicle panel 32, thereby sealing the vehicle panel 32.

The mounting bracket fastener apertures 40 are aligned with the damper member fastener apertures 74. The shifter cable 28 has a first end 25 connected to the shift member 24 and a second end 27 connected to the transmission assembly 26. The shifter cable 28 is passed through the conduit portion 52 of the sealing grommet 48 to pass the shifter cable 28 through the vehicle panel 32. An outer sheath of the shifter cable 28 is fixed to the conduit portion 52, and an internal cable moves within the outer sheath when the shift member 24 is operated. The damper member 68 is configured to reduce application to the mounting bracket 34 of vibration generated by the transmission assembly 26. By reducing the application of vibration generated by the transmission assembly 26 to the mounting bracket 34, the damper member 68 reduces noise produced by the vehicle panel 32 and the bracket 34 as combined.

A first cable damper member 61 is disposed on the shifter cable 28 proximate the first end 25, as shown in FIG. 2. A second cable damper member 63 is disposed on the shifter cable 28 proximate the second end 27. The first and second cable damper members 61 and 63 reduce vibrations from the transmission 26 being applied to the shift selector assembly 22, thereby reducing the physical vibrations felt at the shift selector assembly 22 and the center console 14. The damper member 68 is disposed on the mounting bracket 34 between the first and second cable damper members 61 and 63, and substantially reduces audible noise produced by transmission of vibrations to the vehicle panel 32.

Figure 16:
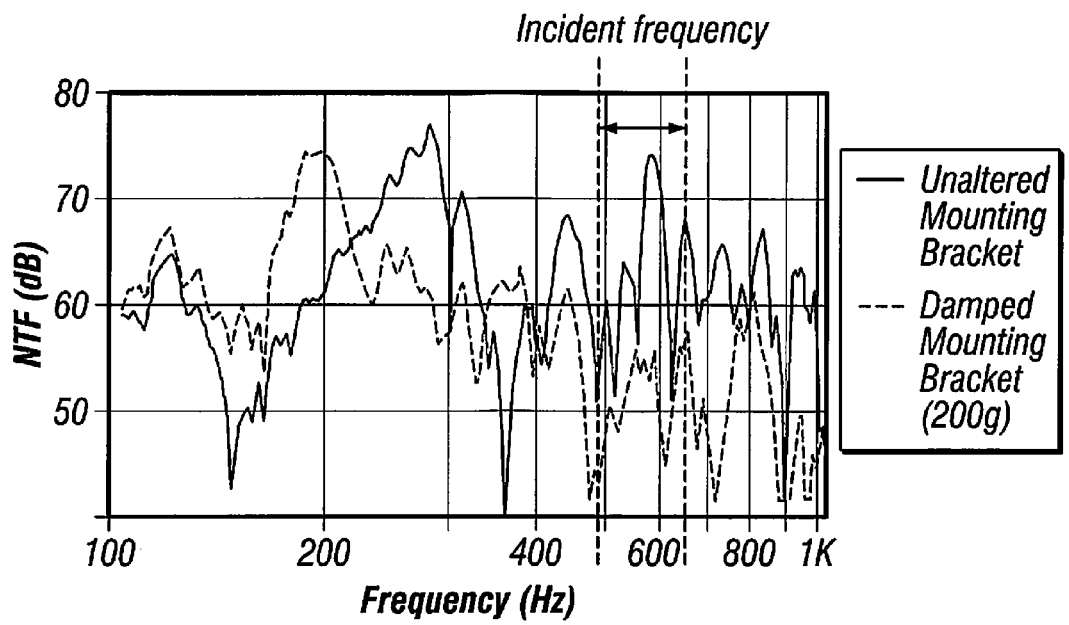
FIG. 16 is a graph of the frequency of the noise transmission of the bracket.

A vibration analysis of the shifter cable assembly 12 in accordance with an exemplary embodiment of the present invention is shown in the graph of FIG. 16. The noise transfer function (in dB) is plotted versus frequency (in Hz) for the shifter cable assembly 12 (represented by a dashed line) and for an undamped mounting bracket (represented by a solid line). The graph of FIG. 16 shows that the application of vibration applied to the vehicle panel 32 generated by the transmission assembly 26 over the incident frequency range (approximately 500-700 Hz) is reduced. Accordingly, by reducing the vibration applied to the vehicle panel, the resulting noise is similarly reduced.

Figure 17:
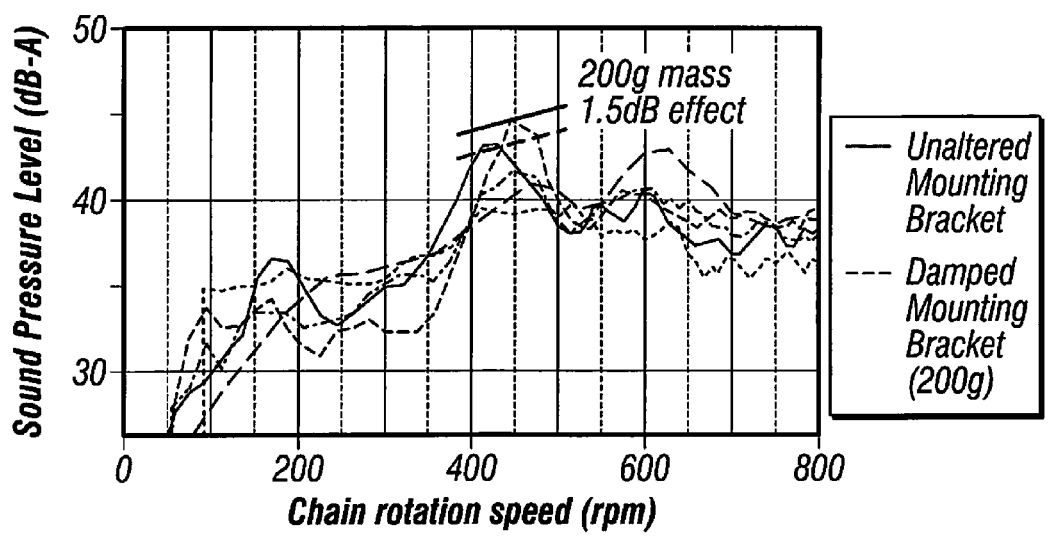
FIG. 17 is a graph of the chain rotation speed of the transmission to the sound pressure level.

A graph of the sound pressure level (in db-A) as observed at a driver seat 13 of the vehicle 10 versus the chain rotation speed (in rpm) is shown in FIG. 17. As shown in the graph, when the transmission assembly 26 is operated at a range of approximately 400-500 rpm, the damper member 68 reduces the noise to less than 45 dB-A. The undamped mounting bracket is indicated by the solid line, and the damped mounting bracket is indicated by the dashed line. As shown, the damped mounting bracket reduced the sound pressure level by approximately 1.5 dB-A.

The graphs of FIGS. 16 and 17 were generated with a damper member 68 having a total weight of approximately 200 grams. As shown in FIGS. 7 and 8, the first leg 78 is shaped differently from the second leg 80 of the damper member 68. A weight of the first leg 78 is different from a weight of the second leg 80 when the first and second legs have different shapes, as shown in FIGS. 7 and 8. For example, the weight of the first leg 78 can be approximately sixty percent of the total weight of the damper member 68 and the weight of the second leg 80 can be approximately forty percent of the total weight. Any suitable weight distribution of the damper member 68 can be used. For example, the first and second legs can be similarly shaped to have substantially equal weights, thereby evenly distributing the weight of the damper member.

General Interpretation of Terms

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Also as used herein to describe the above embodiment(s), the following directional terms "forward", "rearward", "above", "downward", "vertical", "horizontal", "below" and "transverse" as well as any other similar directional terms refer to those directions of a vehicle.

The terms of degree such as "substantially", "generally", "about" and "approximately" as used herein mean a reasonable amount of deviation of the modified term such that the end result is not significantly changed.

While only selected exemplary embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the exemplary embodiments according to the present invention are provided for illustration only, and not for the purpose of limiting the invention as defined by the appended claims and their equivalents.

What is claimed is:

1. A shifter cable assembly of a vehicle, comprising:
   a vehicle panel selected from a floor panel and a dash wall panel;
   a transmission disposed on a first side of the vehicle panel;
   a shift member disposed on a second side of the vehicle panel opposite the first side;
   a mounting bracket rigidly attached to the vehicle panel;
   a sealing grommet having a sealing portion sandwiched between the mounting bracket and the vehicle panel, and a conduit portion;
   a shifter cable received by the conduit portion of the sealing grommet, with a first end of the shifter cable connected to the transmission, and a second end of the shifter cable connected to the shift member; and
   a damper member connected to the mounting bracket, the mounting bracket being positioned between the damper member and the vehicle panel, the damper member being configured to reduce application to the mounting bracket of vibration generated by the transmission.

2. The shifter cable assembly according to claim 1, wherein the damper member is substantially U-shaped.

3. The shifter cable assembly according to claim 2, wherein a first weight of a first leg of the damper member is different from a second weight of a second leg of the damper member.

4. The shifter cable assembly according to claim 2, wherein a first weight of a first leg is approximately sixty percent of a total weight of the damper member, and a second weight of a second leg of the damper member is approximately forty percent of the total weight.

5. The shifter cable assembly according to claim 2, wherein a first leg of the damper member is shaped differently from a second leg of the damper member.

6. The shifter cable assembly according to claim 1, wherein the mounting bracket defines a plurality of first fastener apertures, the damper member defines a plurality of second fastener apertures aligned with the first fastener apertures, with fasteners extending through the first and second fastener apertures to rigidly attached the mounting bracket to the vehicle panel.

7. The shifter cable assembly according to claim 1, wherein the mounting bracket defines a first conduit opening, the damper member defines a second conduit opening, with a perimeter of the second conduit opening aligned with a perimeter of the first conduit opening on at least three sides, and the conduit portion has a projection extending through the first conduit opening.

8. The shifter cable assembly according to claim 1, wherein the sealing grommet has a plurality of attachment projections for attaching the sealing grommet to the mounting bracket, the mounting bracket defines a plurality of first projection apertures, and the damper member defines a plurality of second projection apertures aligned with the first projection apertures, with the projections extending through the first and second projection apertures.

9. The shifter cable assembly according to claim 1, wherein the sealing portion of the sealing grommet is disposed on a first side of the mounting bracket, and the damper member is disposed on a second side of the mounting bracket that is opposite the first side.

10. The shifter cable assembly according to claim 1, wherein
the damper member is configured to reduce application of vibration in the range of 500-700 Hz generated by the transmission to the vehicle panel.

11. The shifter cable assembly according to claim 1, wherein
the damper member is configured to reduce a noise produced by the vehicle panel in response to the application to the mounting bracket of vibration generated by the transmission.

12. The shifter cable assembly according to claim 1, wherein
the damper member is configured to reduce the noise to less than 45 dB-A when the transmission is operated at a range of 400-500 RPM, as observed at a driver seat of the vehicle.

13. The shifter cable assembly according to claim 1, wherein
a shape of the damper member substantially corresponds to a shape of the mounting bracket.

14. The shifter cable assembly according to claim 1, further comprising:
a first cable damper member disposed on the shifter cable proximate the first end; and
a second cable damper member disposed on the shifter cable proximate the second end, with the damper member located between the first cable damper member and the second cable damper member, the first cable damper member and the second cable damper member being configured to reduce application to the shifter member of vibration generated by the transmission.

15. A shifter cable assembly of a vehicle, comprising:
a vehicle panel selected from a floor panel and a dash wall panel;
a transmission disposed on a first side of the vehicle panel;
a shift member disposed on a second side of the vehicle panel opposite the first side;
a mounting bracket rigidly attached to the vehicle panel, and defining a first conduit opening;
a sealing grommet having a sealing portion sandwiched between the mounting bracket and the vehicle panel, and a conduit portion including a projection extending through the first conduit opening;
a shifter cable received by the conduit portion of the sealing grommet, with a first end of the shifter cable connected to the transmission, and a second end of the shifter cable connected to the shift member; and
a damper member connected to the mounting bracket, the damper member having a U-shape including a first leg, a second leg, and a bridge portion between the first and second legs, wherein the first leg, second leg, and bridge portion define a second conduit opening, with a periphery of the second conduit opening aligned with a periphery of the first conduit opening of the mounting bracket on three sides and the projection of the conduit portion of the sealing grommet extending through the second conduit opening, the damper member being configured to reduce application to the mounting bracket of vibration generated by the transmission.

16. The shifter cable assembly according to claim 15, wherein
a first weight of a first leg of the damper member is different from a second weight of a second leg of the damper member.

17. The shifter cable assembly according to claim 15, wherein
a shape of the damper member substantially corresponds to a shape of the mounting bracket.

18. The shifter cable assembly according to claim 15, wherein
a first leg of the damper member is shaped differently from a second leg of the damper member.

19. The shifter cable assembly according to claim 15, wherein
the damper member is configured to reduce application of vibration in the range of 500-700 Hz generated by the transmission to the vehicle panel.

20. The shifter cable assembly according to claim 15, wherein
the damper member is configured to reduce the noise to less than 45 dB-A when the transmission is operated at a range of 400-500 RPM, as observed at a driver seat of the vehicle.

\* \* \* \* \*